(No Model.)
E. J. BERG.
REGULATING PHASE RELATION OF ALTERNATING CURRENTS
No. 554,230. Patented Feb. 11, 1896.
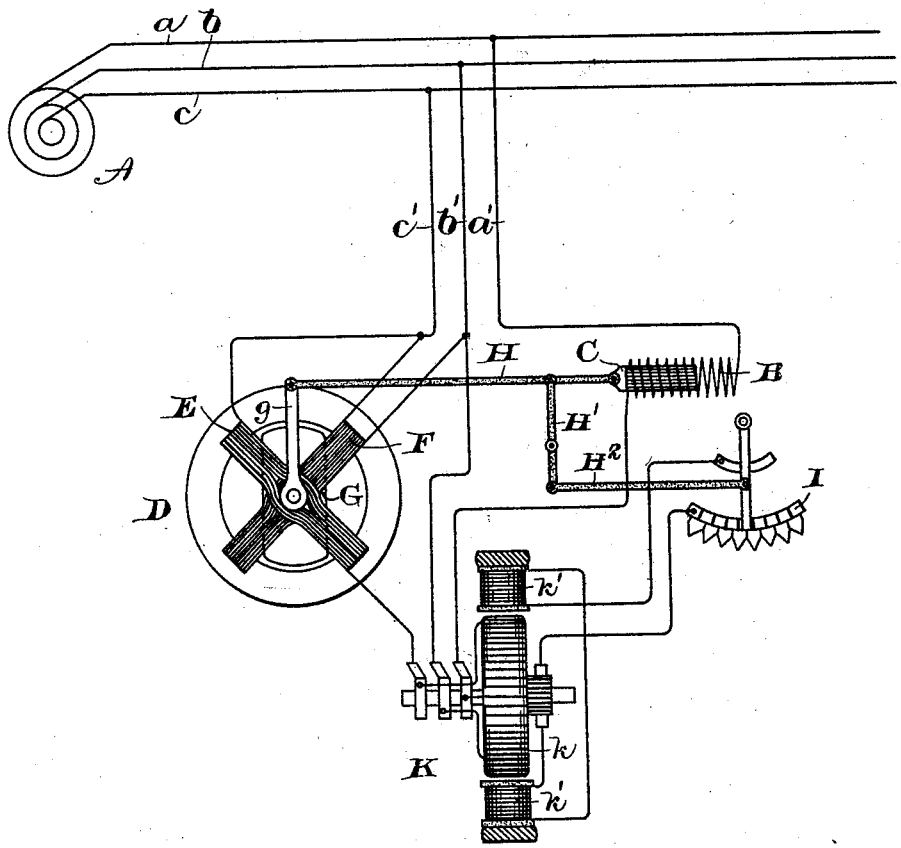
WITNESSES.
A. F. Macdonald.
N. L. Reid
INVENTOR —
Ernst J. Berg, by
Geo. R. Blodgett,
atty.

UNITED STATES PATENT OFFICE.

ERNST J. BERG, OF SCHENECTADY, NEW YORK, ASSIGNOR TO THE GENERAL ELECTRIC COMPANY, OF NEW YORK.

REGULATING PHASE RELATION OF ALTERNATING CURRENTS.

SPECIFICATION forming part of Letters Patent No. 554,230, dated February 11, 1896.

Application filed October 8, 1895. Serial No. 565,055. (No model.)

*To all whom it may concern:*

Be it known that I, ERNST J. BERG, a subject of the King of Sweden and Norway, residing at Schenectady, in the county of Schenectady, State of New York, have invented certain new and useful Improvements in Regulating Phase Relation of Alternating Currents, (Case No. 278,) of which the following is a specification.

My invention relates to the control of alternating-current apparatus, and has particular reference to so regulating the phase relation of alternating currents (by which I mean the relation between current and electromotive force in such circuits) as to increase the efficiency of a system of distribution.

It is well known that the most efficient operation under ordinary circumstances is obtained for alternating-current systems of distribution when the current and electromotive force in the circuit are in phase. I have devised an arrangement of apparatus which will respond to a difference of phase between the current and electromotive force, and by such response will tend to correct the distortion or displacement of phase between the two power elements in the circuit.

To attain the objects of my invention I prefer to employ a synchronous motor connected between the lines of the system of distribution. To control the excitation of this motor I employ an ordinary resistance, though any other means of so controlling the field may be used to accomplish my purpose. To control the amount of resistance in circuit with the field I connect to the rheostat a current-actuated device influenced by the amount of current passing to the synchronous motor, and opposing this current device a watt mechanism, so that when the current is in phase with the electromotive force the power exerted by the watt mechanism is balanced by that of the current-actuated device, and the resistance will not be changed. When, however, the current lags, it becomes larger, and therefore the current-actuated mechanism acts with more force than the watt mechanism, which depends upon the relation between the current and electromotive force for its energy. The amount of resistance is then changed, the excitation of the synchronous motor is altered, and its effect upon the lines between which it is coupled is so varied as to restore the phase relation of the current.

The accompanying drawing shows diagrammatically a convenient embodiment of my invention.

A is a generator of alternating currents, represented as of the three-phase type, although this is immaterial, it being well understood in the art that the number of phases generated does not affect the invention. $a\ b\ c$ are the lines leading from this generator. $a'\ b'\ c'$ are leads from the lines to the armature $k$ of the synchronous motor K. In the lead $a'$ is a coil B actuating a core C, which forms the current-actuated device of my invention. In the lead $c'$ is connected the series coil E of the watt-meter device D. The shunt-coil F of the same device is arranged at a right angle to the series coil, and is connected between the lines $b'\ c'$. A rotating shuttle or magnetic body G is mounted in the field of the coils, which are, of course, provided with a suitable magnetic supporting structure. An arm $g$ is fixed to the shaft carrying the shuttle G, and is actuated by its rotation. A system of levers H H' H$^2$ actuates the controlling-arm of the resistance I coupled in the circuit of the field-magnets $k'$. The motor is represented as self-excited, but may be separately excited without affecting the invention.

Other forms of apparatus may be readily devised embodying the essence of my invention, which is, briefly, the use of opposing electromagnetic devices, the opposition of which is balanced when the current and electromotive force of the alternating-current circuit are in phase, but of which one will overpower the other whenever these two power components are out of phase, and the actuation by these electromagnetic devices of any suitable means for restoring the phase relation.

The particular arrangement which I have devised is simple and convenient and is to be preferred; but it is manifest that those skilled in the art could readily change the devices without departing from the principles set out herein.

What I claim as new, and desire to secure by Letters Patent of the United States, is—

1. An alternating generator, lines extending therefrom between which electromotive forces are to be maintained, electromagnetic devices responsive to a change in phase relation of current and electromotive force in said lines and acting in opposition to each other, such opposition being balanced when the current and electromotive force are in phase, and means actuated by the electromagnetic devices for restoring the phase relation.

2. A generator of alternating electromotive forces, lines leading therefrom between which such forces are to be maintained, an electromagnetic device actuated by the current in such lines and a watt mechanism connected to the lines, the two devices acting in opposition and being balanced when the current and electromotive force are in phase, and means actuated by a disturbance of the balance for restoring the phase relation when displaced.

3. A generator of alternating electromotive forces, lines leading therefrom between which such forces are to be maintained, a synchronous motor connected to the lines, a solenoid in one of the lines, a watt mechanism comprising a series coil and a coil in shunt; the solenoid and the watt mechanism being in opposition to each other when the current and electromotive force of the circuit are in phase, means for controlling the excitation of the synchronous motor, and a connection between such means, the solenoid and the watt mechanism.

4. A generator of alternating electromotive forces, lines leading therefrom between which such forces are to be maintained, a synchronous motor connected to the lines, a solenoid in one of the lines, a watt mechanism comprising a series and a shunt coil, the solenoid and the watt mechanism being in opposition to each other when the current and electromotive force of the circuit are in phase, a resistance in the field-circuit of the motor, and a connection between the solenoid, watt mechanism and resistance.

5. The means for preserving the phase relation of current and electromotive force in alternating circuits herein set out, consisting of a current-actuated device and a watt mechanism opposed in their action, and means actuated thereby for restoring the phase relation when disturbed.

In witness whereof I have hereunto set my hand this 27th day of September, 1895.

ERNST J. BERG.

Witnesses:
ROBT. G. DUDLEY,
F. M. MERRILL.